United States Patent
Azara et al.

(10) Patent No.: US 7,542,903 B2
(45) Date of Patent: Jun. 2, 2009

(54) SYSTEMS AND METHODS FOR DETERMINING PREDICTIVE MODELS OF DISCOURSE FUNCTIONS

(75) Inventors: Misty Azara, Seattle, WA (US); Livia Polanyi, Palo Alto, CA (US); Giovanni L. Thione, San Francisco, CA (US); Martin H. Van Den Berg, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 756 days.

(21) Appl. No.: 10/781,443

(22) Filed: Feb. 18, 2004

(65) Prior Publication Data

US 2005/0182625 A1  Aug. 18, 2005

(51) Int. Cl.
G10L 15/18 (2006.01)
G06F 17/20 (2006.01)
G06F 17/27 (2006.01)
G06F 17/21 (2006.01)

(52) U.S. Cl. .............. 704/257; 704/1; 704/9; 704/10

(58) Field of Classification Search ............ 704/9, 704/257, 8, 1, 10
See application file for complete search history.

(56) References Cited

U.S. PATENT DOCUMENTS

| | | | | |
|---|---|---|---|---|
| 5,749,071 A | * | 5/1998 | Silverman | 704/260 |
| 5,761,637 A | * | 6/1998 | Chino | 704/231 |
| 5,890,117 A | * | 3/1999 | Silverman | 704/260 |
| 2005/0086592 A1 | | 4/2005 | Polanyi et al. | |
| 2005/0171926 A1 | | 8/2005 | Thione | |
| 2005/0182618 A1 | * | 8/2005 | Azara et al. | 704/9 |
| 2005/0182625 A1 | | 8/2005 | Azara et al. | |
| 2005/0187772 A1 | | 8/2005 | Azara et al. | |

OTHER PUBLICATIONS

Yang, Li-Chiung. "Visualizing Spoken Discourse: Prosodic Form and Discourse Functions of Interruption," Sep. 2001, Procs. of the Second SIGdial Workshop on Discourse and Dialogue vol. 16.*

Jurafsky, D. et al., "Automatic Detection of Discourse Structure for Speech Recognition and Understanding," Dec. 1997, IEEE Procs. of 1997 Workshop on Automatic Speech Recognition and Understanding, pp. 88-95.*

Shriberg, Elizabeth et al., Can Prosody Aid the Automatic Classification of Dialog Acts in Conversational Speech, Language and Speech 41 (3-4): 439-487. Special Issue on Prosody and Conversation, 1998.*

(Continued)

Primary Examiner—Patrick N Edouard
Assistant Examiner—Douglas C Godbold
(74) Attorney, Agent, or Firm—Sughrue Mion, PLLC

(57) ABSTRACT

Techniques are provided for determining predictive models of discourse functions based on prosodic features of natural language speech. Inter and intra sentential discourse functions in a training corpus of natural language speech utterances are determined. The discourse functions are clustered. The exemplary prosodic features associated with each type of discourse function are determined. Machine learning, observation and the like are used to determine a subset of prosodic features associated with each type of discourse function useful in predicting the likelihood of each type of discourse function.

19 Claims, 11 Drawing Sheets

OTHER PUBLICATIONS

Dahlbäck, N. and Jönsson, A. 1989. Empirical studies of discourse representations for natural language interfaces. In Proceedings of the Fourth Conference on European Chapter of the Association For Computational Linguistics (Manchester, England, Apr. 10-12, 1989). European Chapter Meeting of the ACL. Association for Computational Linguistics, Mo.*

Black A.; Taylor, P.: CHATR: a generic speech synthesis system in Proceedings of COLING74, II p. 83-986, Kyoto, 1994.

Haller, S. Fossum, T.: "The Association Between Subject Matter and Discourse Segmentation", In The Proceedings of the Florida AI Research Symposium, Key West, FL, May 2001.

Long, S.; Kooper, R.; Abowd, G.; Atkeson, C., "Rapid Prototyping of Mobile Context-Aware Applications: the CyberGuide Case Study", in the Proceedings of the 2nd ACM International Conferenece on Mobile Computing and Networking (MobiCom'96), pp. 97-107, Nov. 10-12, 1996.

Shriberg., E.; Stolke, A.; Hakkani-Tur, Dilek; Tur, Gokhan, "Prosody-Based Segmentation of Speech Utterances into Sentences and Topics" in Speech Communication, 2000, 32, 1-2, Sept, pp. 127-154.

Stolcke., A.; Schriberg, E.; Bates, R.; Coccaro N.; Jurafsky, D.; Martin, R.; Meteer, M.; Ries, K.; Taylor, P.; Van Ess-Dykema, C., "Dialog Act Modeling for Conversational Speech" in Applying Machine Learning to Discourse Processing. Papers from the 1998 AAAI Spring Symposium, Technical Report SS-98-01 (J. Chu-Carroll et al, eds.) Stanford CA pp. 98-105, AAAI Press, Menlo Park CA. 1998.

Wrende, B.; Schriberg, E., "Spotting 'HotSpots' in Meetings: Human Judgments and Prosdic Cues" in Proc. Eurospeech, Geneva, 2003.

Levow, G., "Prosodic Cues to Discourse Segment Boundaries in Human-Computer Dialogue", in 5th SIGdial Workshop on Discourse and Dialogue Boston, Apr. 30 and May 1, 2004.

Lascarides, A. and Oberlander, J., "Temporal Coherence and Defeasible Knowledge", Theoretical Linguistics, 19.1, pp. 1-35, Walter de Gruyter, Berlin, New York, 1993.

"CHATR: A Generic Speech Synthesis System", Dec. 25, 1997, downloaded from http://feast.atr.jp/chatr/manual/index.html Mar. 16, 2006.

"HCRC Project: ID4S Intonation in Dialogue for Speech Recognition", downloaded from http://www.hcrc.ed.ac.uk/Site/IDS4.html Jun. 2, 2004.

Nuance Say Anything Grammars product description, downloaded from http://cafe.bevocal.com/docs/grammar/sayanything.html Jun. 2, 2004.

Ljolje, A., "The AT&T LVCSR-2001 System", May 3, 2001, downloaded from ftp://jaguar.ncsl.nist.gov/evaluations/hub5/may01/pres/att_lvcsr.pdf Mar. 16, 2006.

DARPA Communicator Project: Robust Recognition and Dialog Tracking for Interactive Information Access, Mar. 2003, downloaded from http://ssli.ee.washington.edu/projects/communicator.html Mar. 15, 2006.

Ayers, G.M., 1992. "Discourse functions of pitch range in spontaneous and read speech." Presented at the Linguistic Society of America Annual Meeting.

Brown, G. and Kenworthy, J. 1980 Questions of Intonation, Baltimore, University Park Press, p. 21-122.

Kamp, H. 1981. "A Theory of of Truth and Semantic Representation." in J.A.G. Groenendijk, T. Jannssen, and M. Stokhof (eds.) Formal Methods in the Study of Language. Amesterdam: Mathematisch Centrum, 277-322.

Ladd, D.R. 1983, "Phonological Features of Intonation Peaks", Language, 59:721-759.

Ladd, D.R. 1988. "Declination Reset and the Hierarchical Organization of Utterances" Journal of the Acoustical Society of America, 84(2):530-544.

Mariani, J.; Proubeck, P., 1999 "Language Technologies Evaluation in the European Framework", Proceedings of the DARPA Broadcast News Workshop, Washington: Morgan Kaufman Publishers, pp. 237-242.

Nakatani, C.; Hirschberg, J.; and Grosz, 1995. "Discourse Structure in Spoken Language: Studies on Speech Corpora." In Working Notes of the AAAI-95 Spring Symposium in Palo Alto, CA in Empirical Methods in Discourse Interpretation. pp. 106-112.

Polanyi, L.; and Sch, R., 1984. "A syntactic approach to discourse semantics." Proceedings of the 10th International Conference on Computational Linguistics, Stanford, CA 413-419.

Silverman, K.; Beckman, M.; Pierrehumbert, J.; Ostendorf, M.; Wightman, C.; Price, P.; and Hirschberg, J. 1992. "ToBI: A standard scheme for labeling prosody." In Proceedings of ICSLP. Banff: International Conference on Spoken Language Processing.

Terken, J. 1984. "The distribution of pitch accents in instructions as a function of discourse structure." Language and Speech, 27:269-289.

* cited by examiner

COMMAND[[HERE'S A NEW EMAIL][IT'S TO]] CONTENT [MARK M-A-R-K FAMIGLIO F-A-M-I-G-L-I-O.]

COMMAND[AND THE BODY IS] CONTENT [HI BRIAN]

| IDENTIFIER | DISCOURSE FUNCTION | INITIAL FREQUENCY | PITCH VARIATION | PRECEDING SILENCE | . | . | . | BOUNDARY TONE |
|---|---|---|---|---|---|---|---|---|
| 1 | SUBORDINATION | 175 | 0.15 | 0.10 | . | . | . | 80 |
| 2 | SUBORDINATION | 173 | 0.12 | 0.11 | . | . | . | 80 |
| 3 | SUBORDINATION | 174 | 0.13 | 0.10 | . | . | . | 81 |
| . | . | . | . | . | . | . | . | . |
| . | . | . | . | . | . | . | . | . |
| N | COORDINATION | 150 | 0.10 | 0.15 | . | . | . | 95 |

FIG.11

| IDENTIFIER | DISCOURSE FUNCTION | INITIAL FREQUENCY | PITCH VARIATION | PRECEDING SILENCE | . | . | . | . | BOUNDARY TONE |
|---|---|---|---|---|---|---|---|---|---|
| 1 | SUBORDINATION | 175 | 0.15 | 0.10 | . | . | . | . | 80 |
| 2 | COORDINATION | 150 | 0.10 | 0.14 | . | . | . | . | 100 |
| . | . | . | . | . | . | . | . | . | . |
| . | . | . | . | . | . | . | . | . | . |
| . | . | . | . | . | . | . | . | . | . |

FIG. 12

SYSTEMS AND METHODS FOR DETERMINING PREDICTIVE MODELS OF DISCOURSE FUNCTIONS

BACKGROUND OF THE INVENTION

1. Field of Invention

This invention relates to the determination and use of prosodic information.

2. Description of Related Art

Conventional automatic speech recognition systems compare incoming speech signal information against templates of speech signal information. That is, these conventional systems match the signal information of natural language speech against phoneme, word and phrase based signal information templates. Some conventional automatic speech recognition systems constrain this matching process based on probability models such as co-occurrence, lattice rescoring and the like. Idiosyncratic variations in the input speech information are handled by refinement or personalization of the information associated with the signal information templates.

These conventional automatic speech recognition systems typically operate in either a dictation mode or a command mode. In the dictation mode, the input signal information is matched against signal information templates associated with candidate recognized text. The recognized text then serves as the input to the underlying application. For example, recognized text may be placed into an application such as an editor, word-processor, email editor and the like in lieu of, or in addition to, keyboard input. Since the natural language information in a dictation mode can relate to any subject, these conventional natural language processing systems do not typically exploit information about the domain contained in the speech information.

In a conventional command mode, a language model is determined for the automatic speech recognition system based on the target application for the speech. That is, if an operating system is the target of the speech utterance, the set of valid operating system commands forms a set of signal information templates against which the speech utterance signal information is compared. The use of discrete input modes increases the accuracy and/or responsiveness of conventional natural language processing systems. However, the use of discrete input modes can impede the fluency with which a user interacts with the natural language interface. Thus, rather than directly conversing with systems incorporating these conventional natural language interfaces, users are forced to track the current input mode and/or status of the system. Attempts to automatically determine mode changes between sentences, paragraphs and within sentences has not been very successful.

SUMMARY OF THE INVENTION

Thus, systems and methods for segmenting natural language into relevant discourse functions or contexts would be useful. Various exemplary embodiments according to the systems and methods of this invention provide for training a system to segment speech into discourse function units. The systems and methods according to this invention determine a theory of discourse analysis. A statistically significant training corpus of speech utterances is selected. Prosodic features associated with the speech utterances in the training corpus are determined. The training texts are analyzed using a theory of discourse analysis to determine discourse functions within the text. A predictive model of discourse functions is determined that predicts discourse functions based on the determination of a set of prosodic features. In various other exemplary embodiments according to this invention, additional information provided by the predictive model for discourse functions facilitates the segmentation of natural language speech utterances into the discourse functions necessary to determine mode changes and the like.

BRIEF DESCRIPTION OF THE DRAWINGS

FIG. 11 is an exemplary data structure for storing speech utterance prosody information according to this invention; and FIG. 12 is a data structure for storing prosody information for each of the exemplary discourse functions according this invention;

DETAILED DESCRIPTION OF EXEMPLARY EMBODIMENTS

Figure 1:
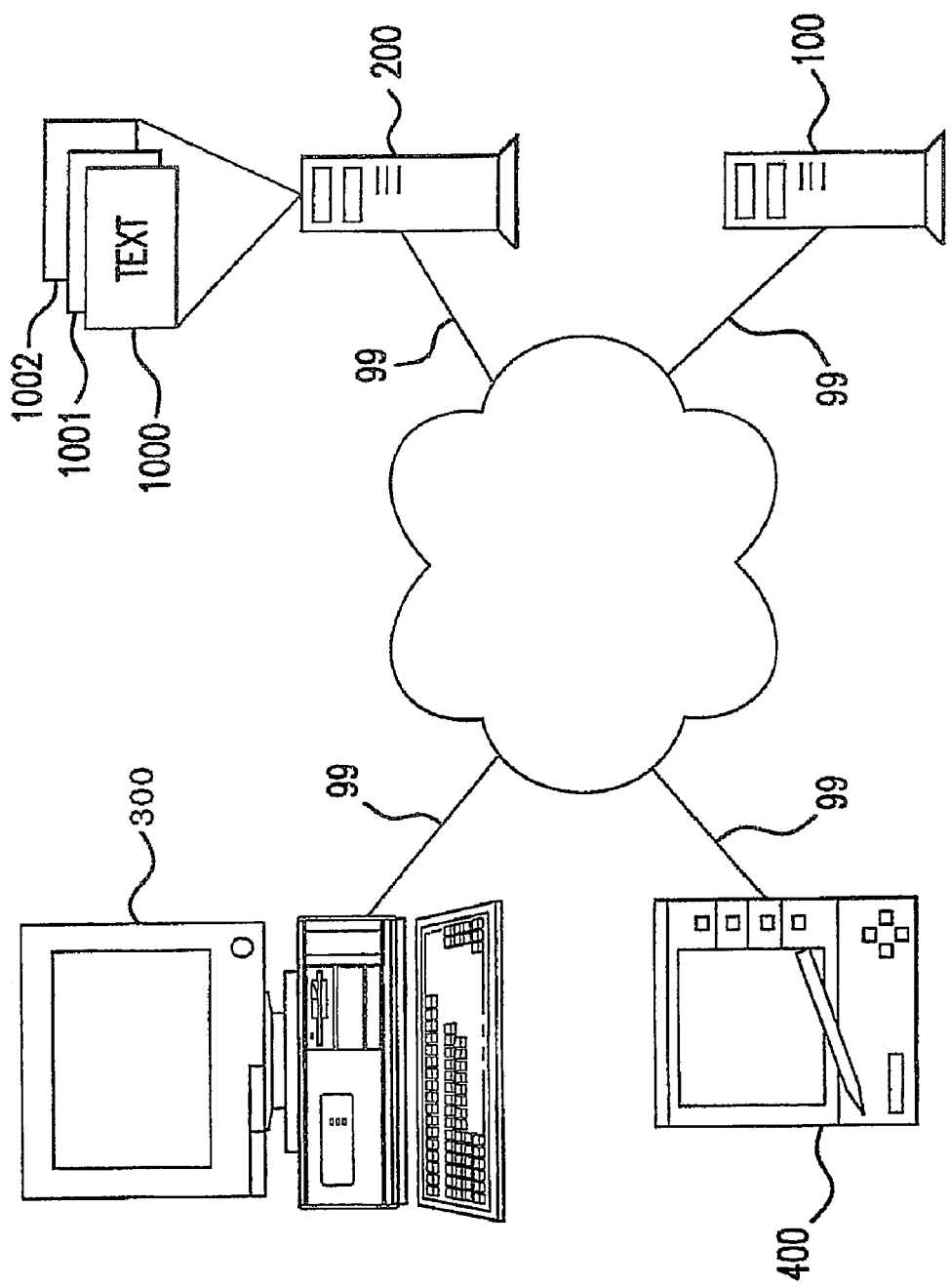
FIG. 1 is an overview of an exemplary system for determining predictive models of discourse functions according to this invention.

FIG. 1 is an overview of an exemplary system for determining predictive models of discourse functions 100 according to this invention. The system for determining predictive models of discourse functions 100 is connected via communications link 99 to a web-enabled personal computer 300, a web-enabled tablet computer 400 and an information repository 200 containing training instances of recorded natural language speech utterances 1000-1002.

In one of the various exemplary embodiments according to this invention, a user of the web-enabled personal computer 300 initiates a request to determine a predictive model of discourse functions for the training instances 1000-1002. The training instances 1000-1002 are associated with of the recorded natural language speech utterances contained in the information repository 200. The request is forwarded over communications link 99 to the system for determining predictive models of discourse functions 100. The system for determining predictive models of discourse functions 100 mediates the request by retrieving the first training instance 1000. The prosodic features of the speech utterance are determined. Prosodic features may include but are not limited to the fundamental frequency, intonational phrase tones, boundary tones, inter utterance silence duration, rate of speech and the like. However, any known or later determined prosodic feature useful in segmenting the natural language speech utterances into discourse functions may also be used in the practice of this invention.

The discourse functions in the natural language speech utterance 1000 are determined. In various exemplary embodiments according to this invention, the discourse functions are determined by recognizing the natural language speech to form a recognized text. The recognized text is then optionally verified. Verification may be performed by comparing the recognized text to human written transcriptions of the speech information. In various other exemplary embodiments according to this invention, the recognized text is verified by using different speech recognition methods and deciding the correct, verified text by majority voting between the different recognition methods. Alternatively, the recognized speech utterances are verified by human verifiers. However, it should be apparent that any known or later developed method of verifying the recognized text may be used without departing from the scope of this invention. After the recognized text has been optionally verified, a theory of discourse analysis is applied to the verified recognized text to determine the discourse functions.

For example, in various exemplary embodiments according to this invention, subordinations, speech repairs, data, commands and/or other discourse functions within the recognized text are determined. Any discourse function that can be identified by the theory of discourse analysis and which is associated with identifiable prosodic information can be determined using the systems and methods of this invention. In one exemplary embodiment, the determined discourse functions are added as annotations within the recognized text. In various other exemplary embodiments according to this invention, a training instance identifier, the location of the determined discourse function within the training instance and a prosodic feature vector describing the prosodic features associated with each discourse function are stored in a data structure for storing discourse function prosody information.

It should be apparent that the prosodic features associated with discourse functions may precede the specific discourse function to be identified, occur during the discourse function or may follow the discourse function depending on the language, speaker, genre and/or other factors. For example, the initial frequency value prosodic feature precedes a discourse function and can be used in the prediction of the type of discourse function to follow. Prosodic features identified after the utterance of the discourse function may also be used to predict the discourse function. Thus, it should be apparent that any prosodic feature helpful in predicting a discourse function, which presents before, during and/or following the utterance of a discourse function may be used in the practice of this invention.

The prosodic features associated with each discourse function in the training corpus of verified recognized speech utterances are then used to determine a predictive model. As discussed above, individual features may be used to determine discourse functions. However, in still other exemplary embodiments, multiple prosodic features associated with a discourse function are combined into a single prosodic feature vector.

A predictive model of discourse functions is then determined. Machine learning, statistical learning, rule induction, Naïve Bayes, decision trees, support vector machines or any known or later developed method of determining a predictive model may be used. The determined predictive model for discourse functions is then saved and/or used.

Figure 2:
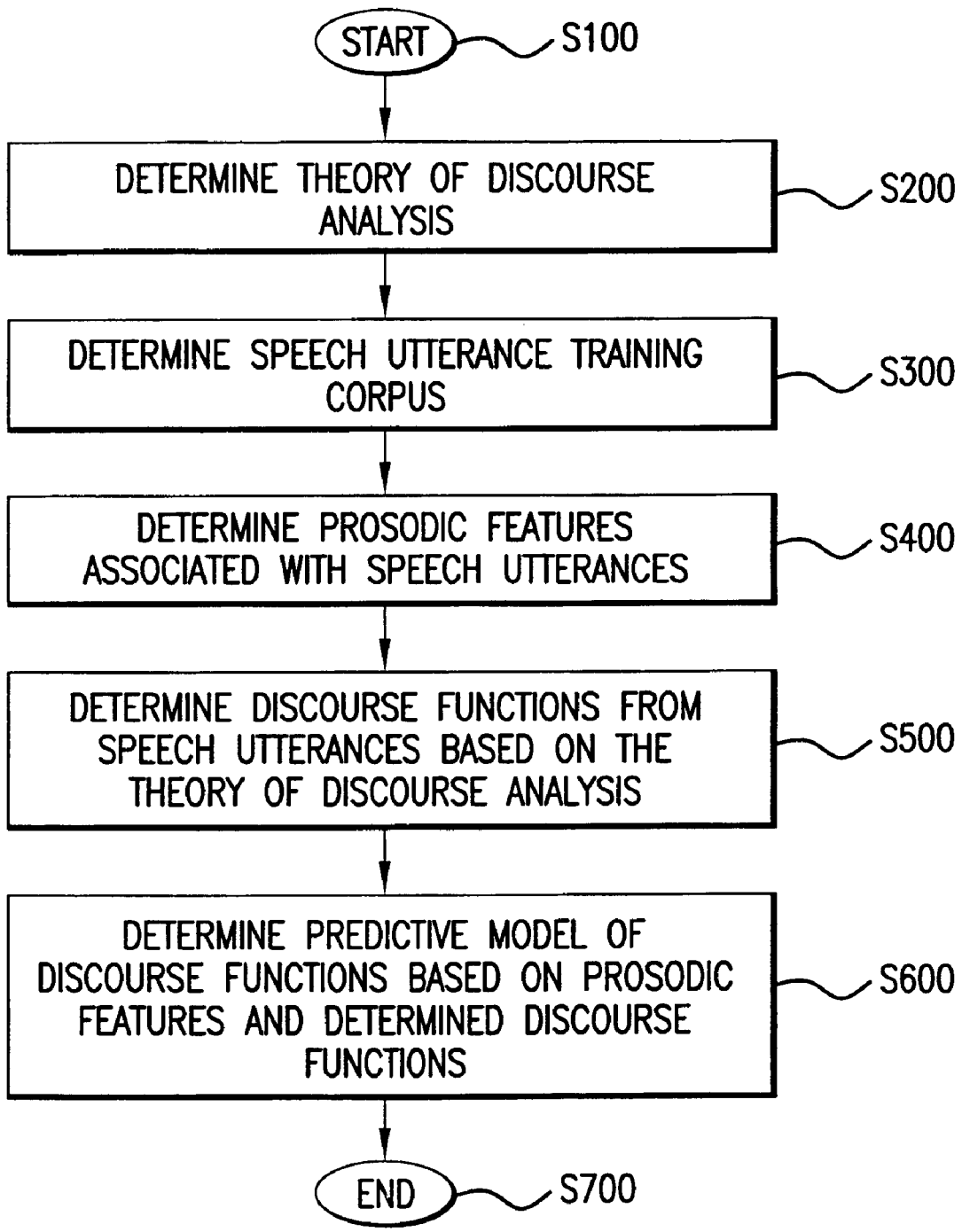
FIG. 2 is an exemplary method for determining predictive models for discourse functions according to this invention.

FIG. 2 is an exemplary method for determining predictive models for discourse functions according to this invention. The process begins at step S100 and immediately continues to step S200.

In step S200, a theory of discourse analysis is determined. The theory of discourse analysis may be previously determined and stored in a memory. In various other exemplary embodiments according to this invention, the theory of discourse analysis is selected based on user input, features associated with the user, a selected application, a usage environment and the like. However, any known or later developed method of selecting a theory of discourse analysis may be used without departing from the scope of this invention.

The determined theory of discourse may include, the Unified Linguistic Discourse Model (ULDM), the Rhetorical Structure Theory (RST), the Discourse Structure Theory, the Structured Discourse Representation Theory (SDRT) or any known or later developed theory of discourse analysis. The Unified Linguistic Discourse Model is discussed further in co-pending U.S. patent application Ser. No. XX/XXX,XXX, entitled "SYSTEMS AND METHODS FOR HYBRID TEXT SUMMARIZATION", filed Oct. 15, 2003, herein incorporated by reference in its entirety. After the theory of discourse analysis has been selected, control then continues to step S300.

In step S300, a training corpus of speech utterances is determined. The training corpus of speech utterances may be a previously determined training corpus such as the Switchboard corpus of the Linguistic Data Consortium. In various other exemplary embodiments, the training corpus may be a user specific training corpus, a training corpus that combines speech utterances from different users into a combined training corpus of speech utterances. However, it should be apparent that any statistically significant corpus of speech utterances may be used in the practice of this invention. After the training corpus of speech utterances has been determined, control continues to step S400.

Prosodic features associated with the speech utterances are determined in step S400. The prosodic features may be determined using any known or later developed signal processing technique applied to the training corpus. However, new prosodic features can also be determined dynamically as new prosodic features and/or new discourse functions are identified. Alternatively, the prosodic features may be determined in a batch mode or the like.

The prosodic features may include but are limited to changes in signal amplitude, changes in pitch range, initial frequency value of the speech utterance, intonational boundary tone assignment indicating different numbers of intonational phrases, silence duration, rate of speech or any known or later developed prosodic feature.

It will also be apparent that combinations of prosodic features may be associated with discourse functions at various levels of discourse structure. Thus, the prosodic features may be used to indicate the segmentation boundaries between words, to indicate intra-sentential and inter-sentential subordinations, paragraphs segments, turn taking segments or any known or later developed discourse structure identifiable by the selected theory of discourse analysis. After the prosodic features associated with the speech utterances have been determined, control continues to step S500.

In step S500, discourse functions are determined based on the speech utterances and the selected theory of discourse analysis. Discourse functions refer to intra-sentential and inter-sentential phenomena used to accomplish task, text and interaction level discourse activities. Discourse functions may include but are not limited to: command giving, initializing tasks, identifying speech recipients or any other known or later developed demarcation of discourse level subordinations.

For example, in one of the exemplary embodiments according to this invention, a theory of discourse analysis is applied to the verified recognized speech utterances associated with the training corpus to determine the discourse functions. After the discourse functions in the training corpus of speech utterances have been determined, control continues to step S600.

In step S600, a predictive discourse model is determined based on the determined prosodic features and the determined discourse functions. The predictive discourse model may be determined using machine learning, statistics, and support vector machines, Naïve Bayes, decision tree induction or any known or later developed method of determining a predictive model. In various other exemplary embodiments, the predictive discourse model may be an incremental predictive model that refines the current predictive model based on new training instances. After the predictive model is determined, control continues to step S700 where the process ends.

Figure 3:
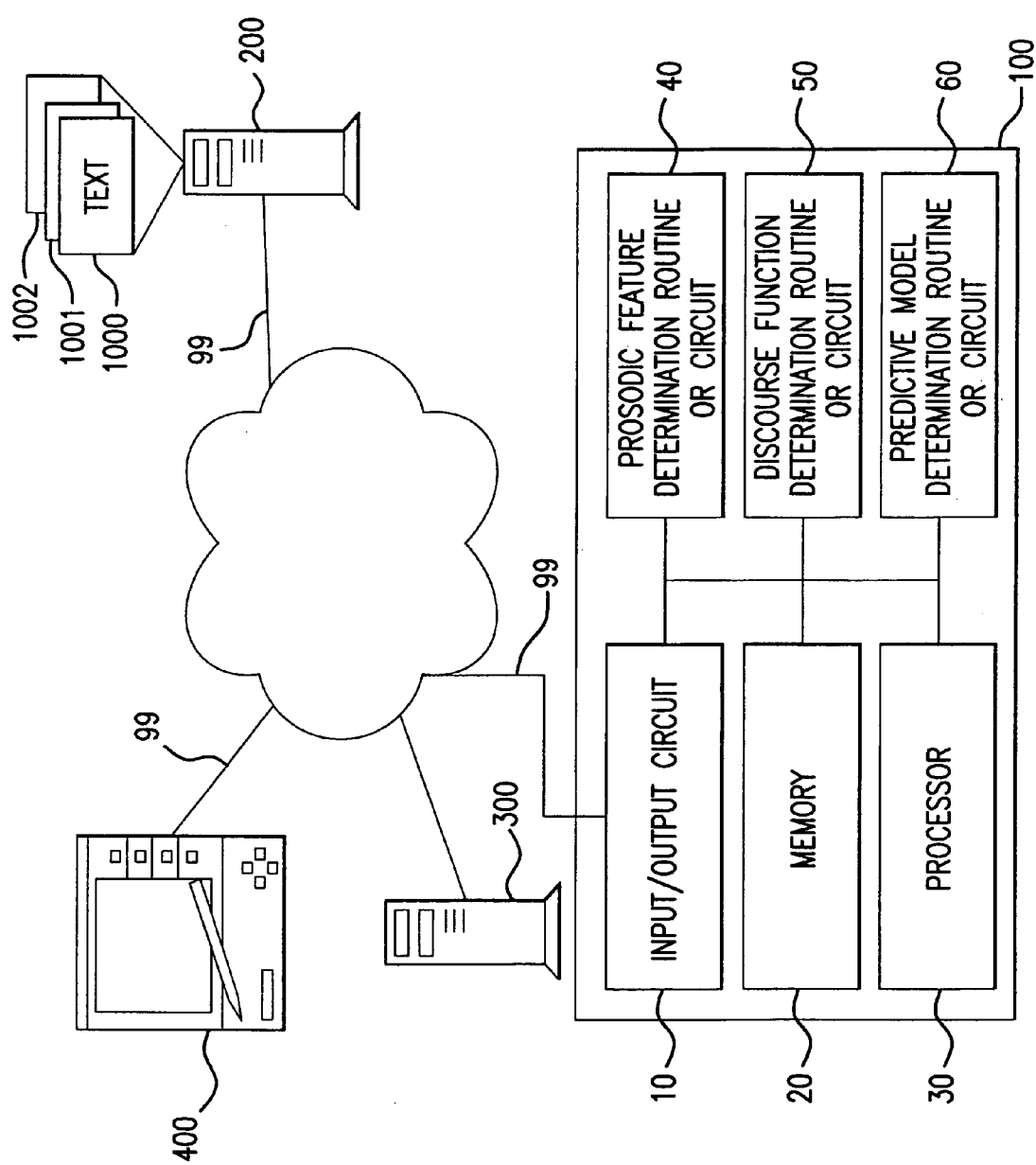
FIG. 3 is an exemplary system for determining predictive discourse models according to this invention.

FIG. 3 is an exemplary system for determining predictive discourse models 100 according to this invention. The system for determining predictive discourse models 100 is comprised of a memory 20; a processor 30; a prosodic feature determination routine or circuit 40; a discourse function determination routine or circuit 50; and a predictive model determination routine or circuit 60, each connected to input/output circuit 10 via the communications link 99, and to a web-enabled personal computer 300, a web-enabled tablet computer 400 and an information repository 200 containing a training corpus of speech utterances 1000-1002.

A user of the web-enabled personal computer 300 or the web-enabled personal computer 400 initiates a request to determine a prosodic feature model for the training instances 1000-1002 of natural language speech utterances contained in information repository 200. The request is forwarded over communications link 99 to the system for determining predictive models of discourse functions 100. The system for determining predictive models of discourse functions 100 retrieves training instance 1000 of the natural language speech utterances from the information repository 200 by activating the input/output circuit 10.

The processor 30 saves the training instance 1000 in memory 20 and activates the prosodic feature determination routine or circuit 40. The prosodic feature determination routine or circuit 40 determines prosodic features in the training instance 1000 such as initial frequency, pitch range, duration, pauses, boundary tones, number of intonational phrases and the like. In various other exemplary embodiments according to this invention, the prosodic feature determination routine or circuit 40 may be a digital signal processor embedded within the automatic speech recognition system. The prosodic feature determination circuit or routine 40 determines the prosodic features of the speech utterances and encodes them as annotations within the recognized speech utterances.

The processor 30 activates the discourse function determination routine or circuit 50 to determine the discourse functions associated with the training instance based on the selected theory of discourse analysis. The discourse functions may include context information, mode indicators or any known or later developed discourse level information useful in segmenting and/or disambiguating speech utterances. For example, prosodic features associated with a first portion of a speech utterance are used to predict the likelihood that the first portion of the speech utterance is associated with a command directed at the current application. Similarly, prosodic features associated with a second portion of the speech utterance may be used to predict that the second portion of the speech utterances in the training instance is content or data. Thus, the prosodic information associated with the first portion of the speech utterance may indicate the speech utterance should be considered a command to the addressing function of an email system. Similarly, prosodic information associated with the second portion of the speech utterance may be used to indicate that the second portion of the speech utterance contains the content portion or addressee information associated with the email message.

After discourse functions for the speech utterances have been determined, the processor 30 determines a predictive discourse function model by activating the predictive model determination routine or circuit 60. The predictive discourse function model routine or circuit 60 associates the prosodic features with the determined discourse functions. The predictive model determination routine or circuit 60 may use using machine learning, statistics, induced decision trees, model lookup or any known or later developed method of determining a predictive model without departing from the scope of this invention. The determined predictive discourse function model is then saved and/or used.

Figure 4:
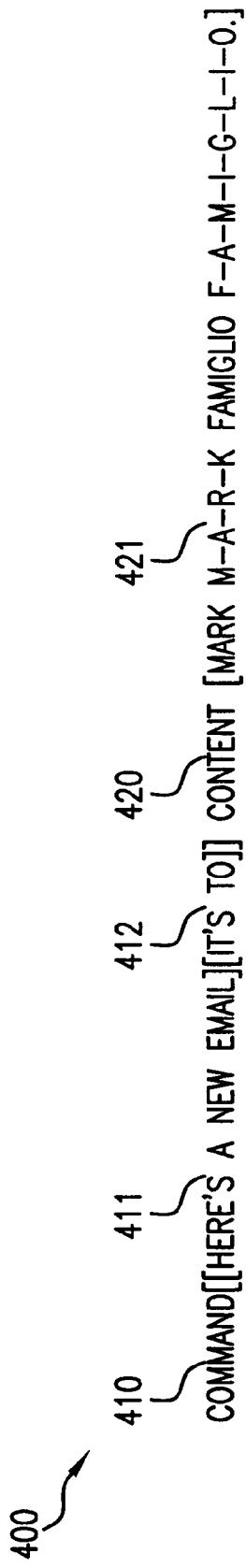
FIG. 4 shows an exemplary sentence annotated according to this invention.

FIG. 4 shows an exemplary sentence 400 annotated according to this invention. The exemplary sentence is temporally annotated with discourse function information.

The exemplary sentence 400 is comprised of a command portion 410 and a content portion 420. The command portion 410 is comprised of first and second text portions 411-412. The content portion 420 is comprised of a single text portion 421.

Prosodic features are used to segment the speech utterance into a command portion 410 and a content portion 420. However, it should be apparent that the predictive discourse function models may also be used to determine any type of discourse function recognizable by the theory of discourse analysis. For example, in one of the exemplary embodiments according to this invention, the recognition of an ambiguous speech utterance may be improved by determining whether the ambiguous speech utterance is subordinated to the previous speech utterance or reflects new information unrelated to the previous speech utterances. The predictive discourse function model accepts the prosodic features of the speech utterance as input and outputs the likely discourse function of the ambiguous speech utterance within the overall discourse. Other exemplary systems (not shown) can use this additional information to rescore the probability of the recognized words appearing within sentences, paragraphs and/or indicate command and/or content boundaries or other segments within the discourse.

Figure 5:
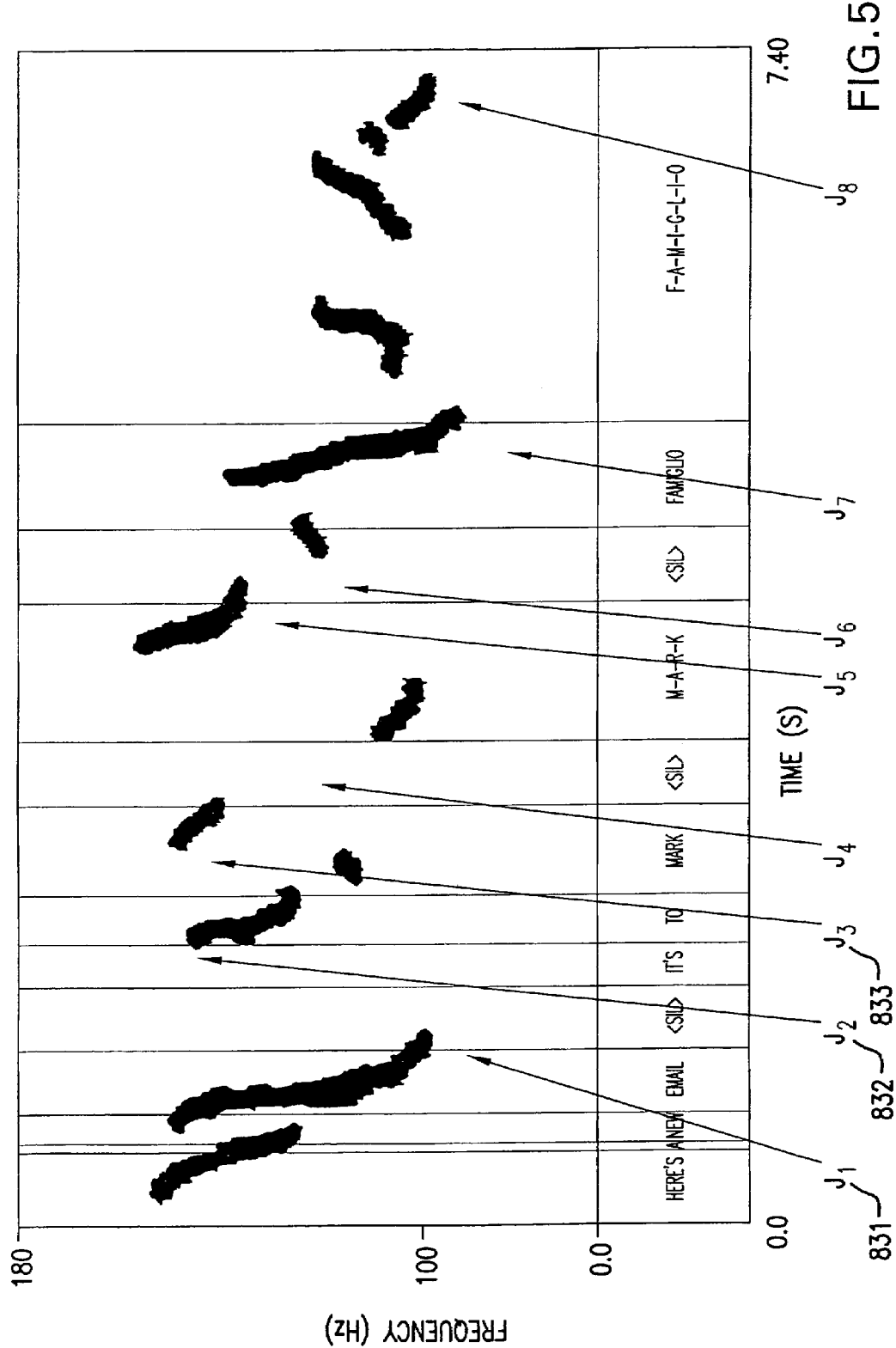
FIG. 5 shows exemplary prosodic feature information associated with a first exemplary training sentence according to this invention.

FIG. 5 shows exemplary prosodic feature information for prosodic features $J_1$-$J_8$ associated with the first exemplary sentence according to this invention. The prosody information associated with a statistically significant number of training sentences is used to determine predictive models of discourse functions. That is, in various exemplary embodiments according to this invention, a predictive model is determined that indicates probable discourse function classifications for segments of natural language speech based on the prosody information identified in the speech. In various other exemplary embodiments according to this invention, the predictive models of discourse functions model are used to refine the discourse level segmentation of the natural language speech.

For example, as shown in FIG. 5, the first exemplary training phrase "Here's a new email. . It's to Mark M-A-R-K Famiglio F-A-M-I-G-L-I-O" is segmented into the command discourse function "Here's a new mail It's to" and the content discourse function "Mark M-A-R-K Famiglio F-A-M-I-G-L-I-O." The terms command and content are merely illustrative and not limiting. Any discourse function identifiable by a theory of discourse analysis and associated with identifiable prosodic features may be used in the practice of this invention. After the exemplary sentence has been segmented into constituent discourse function units, the prosodic features $J_1$-$J_3$ 831-833 in the speech utterances associated with the exemplary training sentence are determined. In various exemplary embodiments, the values for the set of prosodic features associated with a discourse function are combined to form a single prosodic feature vector. This process is repeated for each discourse function identified in the training corpus of speech utterances. In various embodiments, the prosodic feature vector and the determined discourse functions are used to determine a predictive model based on machine learning, statistics and the like.

Figure 6:
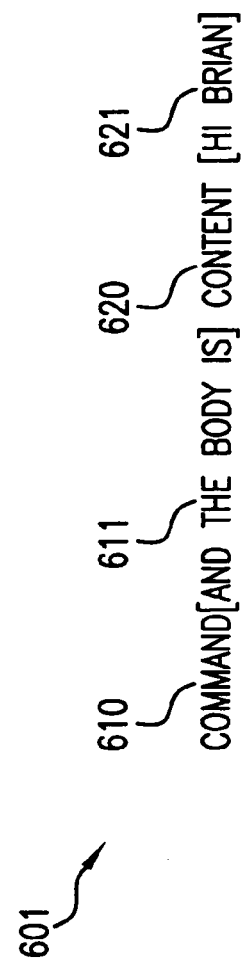
FIG. 6 shows a second exemplary sentence annotated according to this invention.

FIG. 6 shows a second exemplary sentence 600 annotated according to this invention. The second exemplary sentence 600 is comprised of a command portion 610 and a content portion 620. The command portion 610 includes the recognized speech utterance 611 "And the body is". In the absence of further information, the recognized speech utterance may reflect the address and/or the content of an email message. However, based on the additional prosodic information, the predictive discourse function model predicts the likelihood that the recognized speech reflects a command discourse function. Thus, additional systems (not shown) may be used to determine that the recognized speech reflects a request to record subsequent information into the body of an email message. In various exemplary embodiments, recognized speech utterances that are determined to be commands may be used to trigger specific language models and/or recognition grammars and/or other information useful in further improving the recognition accuracy.

The predictive discourse function model in conjunction with the prosodic information associated with the second portion of the speech utterance 631 is used to predict the likelihood that the second portion of the speech utterance is content information. The sentence or phrase can be segmented into command and content portions or any other hierarchy of contexts and/or or discourse functions recognized by the theory of discourse analysis.

Figure 7:
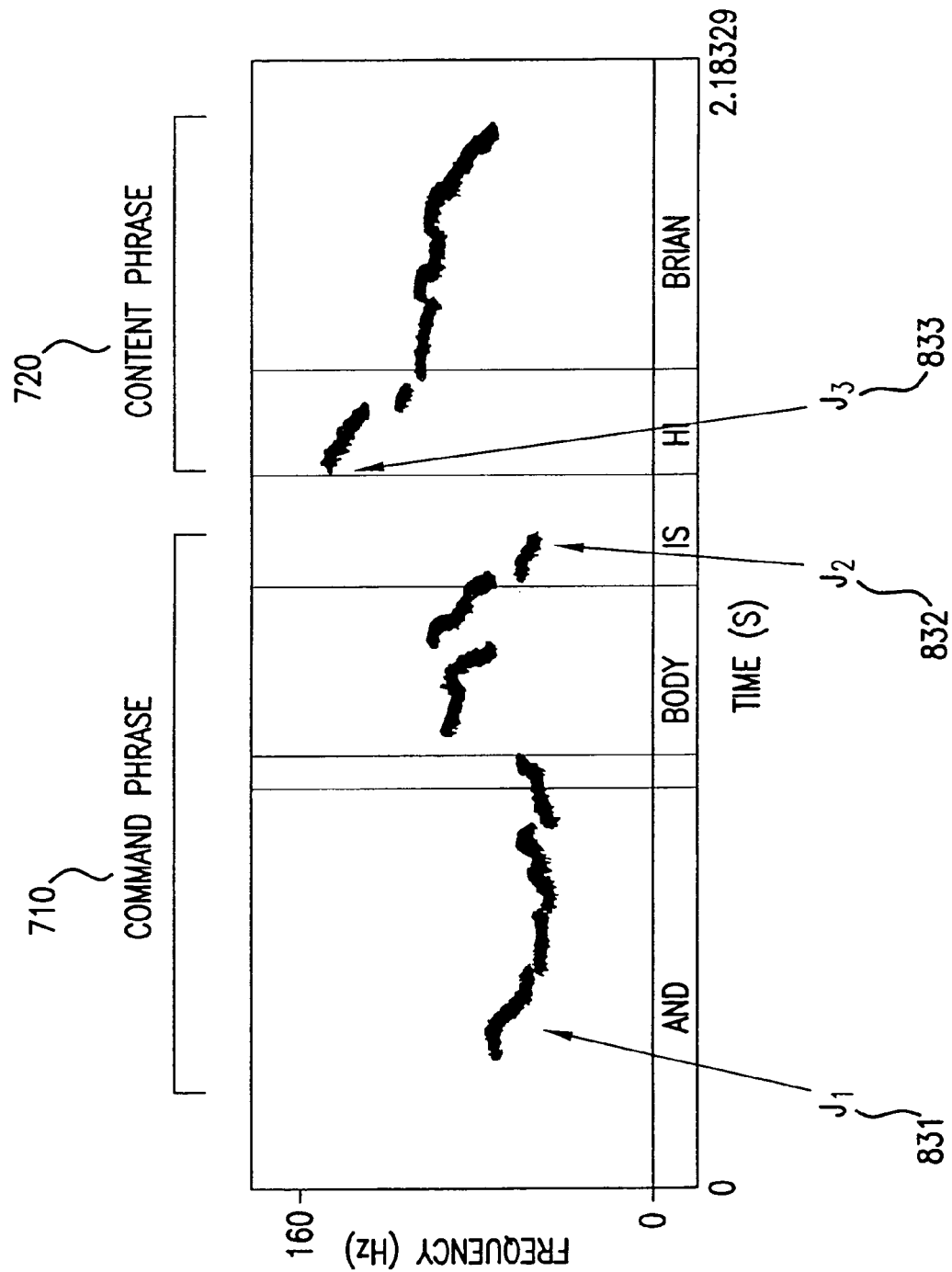
FIG. 7 shows exemplary prosodic feature information associated with a second exemplary sentence according to this invention.

FIG. 7 shows exemplary prosodic features associated with the second exemplary sentence according to one aspect of this invention. The exemplary prosodic features include prosodic features $J_1$-$J_3$ 831-833. As discussed above, the prosodic feature information is used alone or in combination with other prosodic features to determine the context information.

Figure 8:
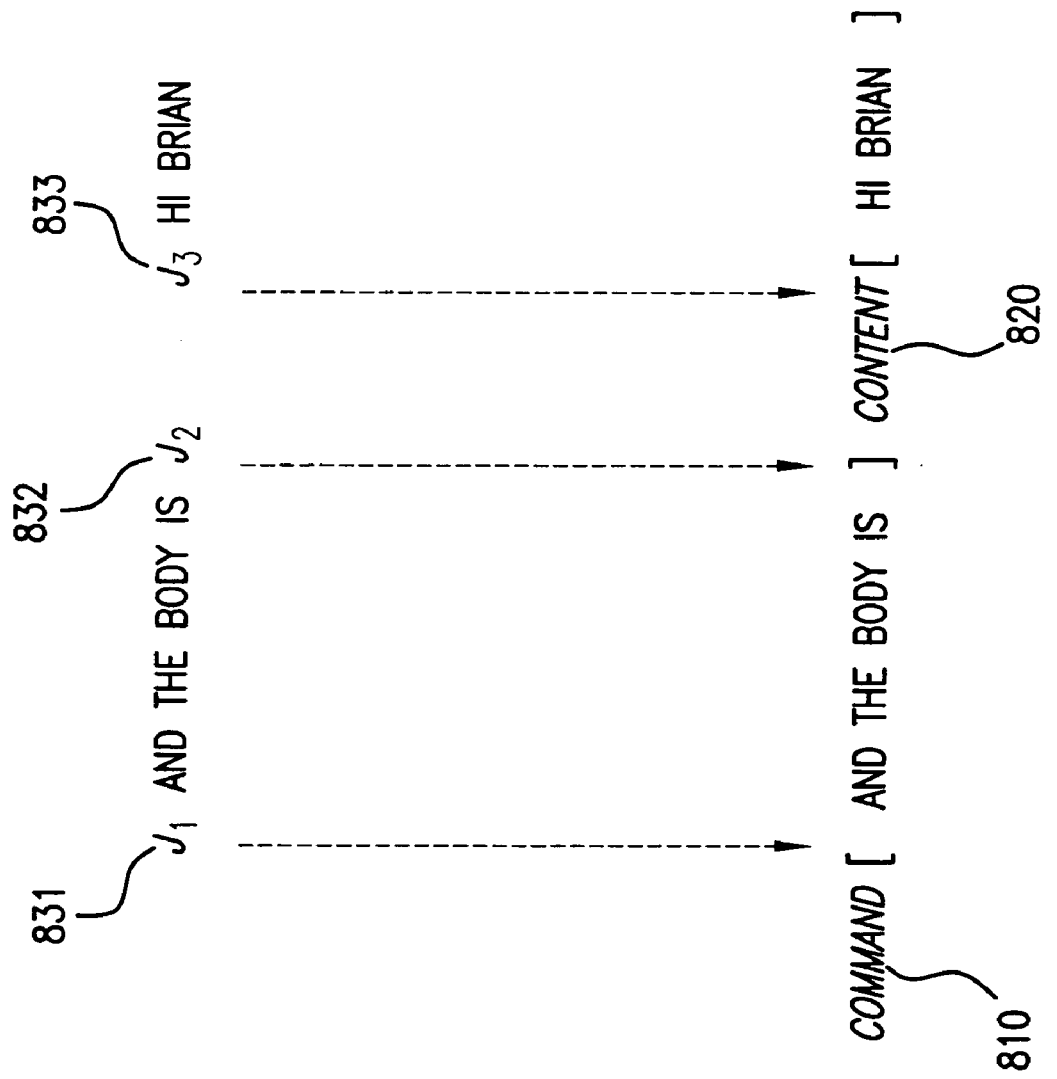
FIG. 8 an exemplary visualization of a sentence annotated with prosodic feature information according to this invention.

FIG. 8 is an exemplary visualization of a sentence annotated with prosodic feature information according to one aspect of this invention. The prosodic feature $J_1$ 831 is a feature associated with the beginning of the command portion 810 of the recognized speech utterance. The end of the command portion 810 is associated with prosodic features $J_2$ 832. The prosodic features $J_1$-$J_2$ 831-833 may be a silence of a specific duration, relative pitch changes or any other prosodic feature associated with the predictive models of discourse functions. It will be apparent that the prosodic features may be used alone or in combination to determine the start and end of the command portion 810 without departing from the scope of this invention.

The start of the content portion 820 is associated with the prosodic features $J_3$ 833. The prosodic features $J_3$ 822 may be a change in the initial pitch, or any other prosodic feature or set of features associated with the start of the content portion 820. In various exemplary embodiments according to this invention, the association between the prosodic features and the discourse function can also be personalized for a specific user. Moreover, the predictive discourse function model can be based on machine learning methods that refine the predictive model over time. In this way, user specific methods of prosodically denoting discourse functions may be incorporated into the predictive discourse function model over time and/or over multiple sessions. In still other exemplary embodiments according to this invention, the prosodic features $J_1$, $J_2$ and $J_3$, 831-833 may be comprised of single prosodic features or may reflect sets of prosodic features. The predictive models of discourse functions may use one or more of the sets of prosodic features and/or additional information to predict the likely discourse function for a recognized speech utterance.

Figure 9:
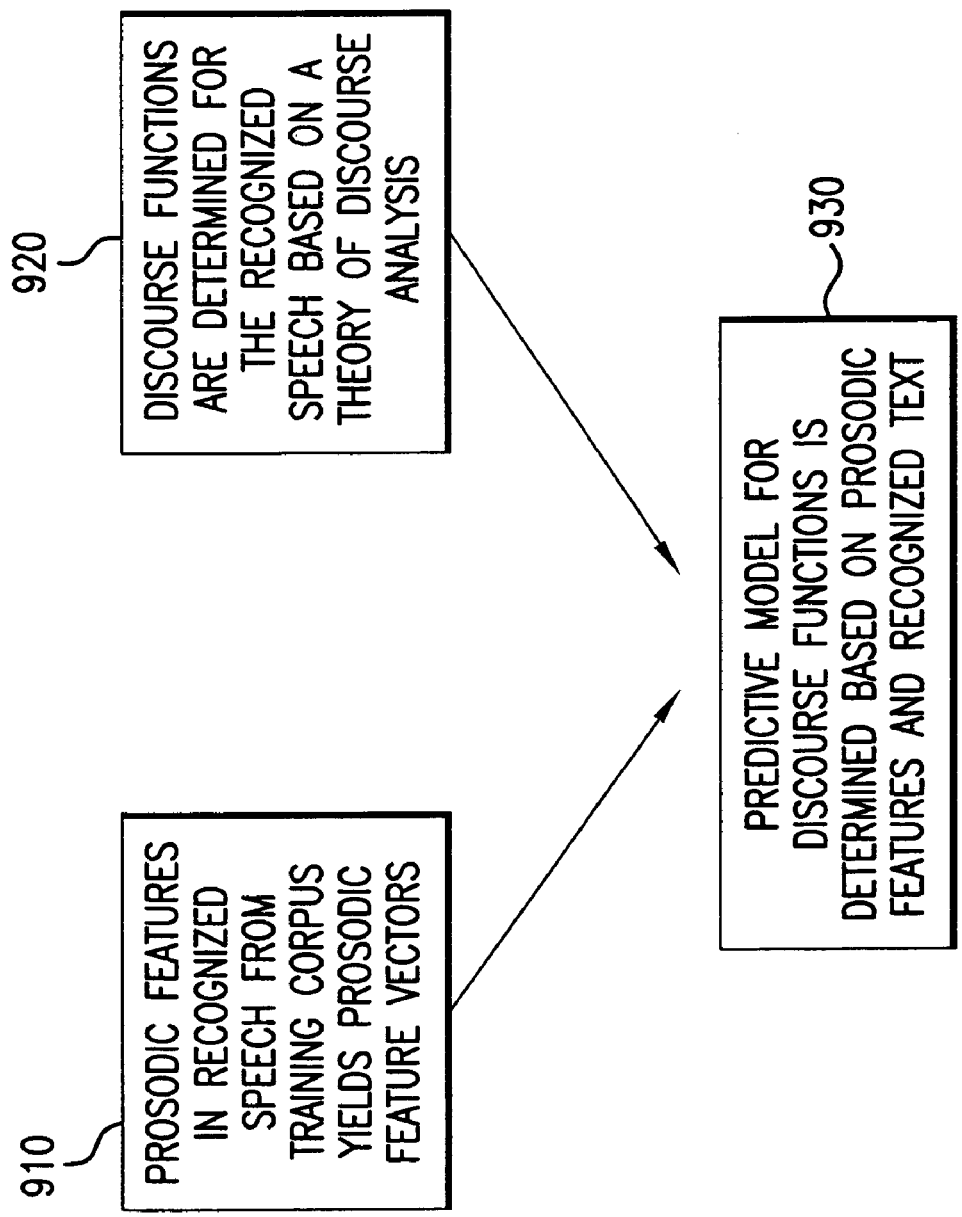
FIG. 9 is a flow diagram of an exemplary system for determining predictive models of discourse functions according to this invention.

FIG. 9 is a flow diagram of an exemplary system for determining predictive models of discourse functions according to this invention. The speech utterances are recognized and prosodic features are determined as one set of inputs. In various exemplary embodiments according to this invention and as discussed above, a prosodic feature vector is determined based on prosodic features determined in a training corpus of speech utterances. The speech utterances are recognized, verified and analyzed to determine discourse functions based on a theory of discourse analysis. For example, if the Unified Linguistic Discourse Model is used, the verified recognized texts associated with the training corpus of speech utterances are segmented into discourse constituents. Segmentation in the Unified Linguistic Discourse Model is comprised of co-ordinations, subordinations and binaries or n-aries. Prosodic features are determined for each training instance of a discourse constituent. Similar discourse constituents are clustered and machine learning, statistics or other techniques are applied to select the prosodic features for the predictive model of discourse functions. The predictive model of discourse functions is then saved to memory. The predictive models of discourse functions can then be used alone or in combination with newly recognized speech utterances to determine the discourse functions.

In various other exemplary embodiments according to this invention, a set of n-best prosodic feature vectors may be used to determine a set of n-best discourse functions and an associated set of n-best segmentations for each of the recognized speech utterances.

For example, the prosodic features associated with discourse functions in a training corpus are determined. The discourse functions may be determined based on a theory of discourse analysis. A predictive model of discourse functions is then determined. The prosodic features are accepted by the predictive model of discourse functions which outputs a prediction of the discourse function likely associated with the speech utterance. In some applications such as word processors, email editors and the like, the use of the discourse function is associated with discriminating between the command mode and/or the content or input mode of an application. However, in various other exemplary embodiments, the systems and methods of this invention may be used to predict subordinations, conversational turn-taking or footing or any other known or later developed discourse function recognized by the determined theory of discourse analysis.

Figure 10:
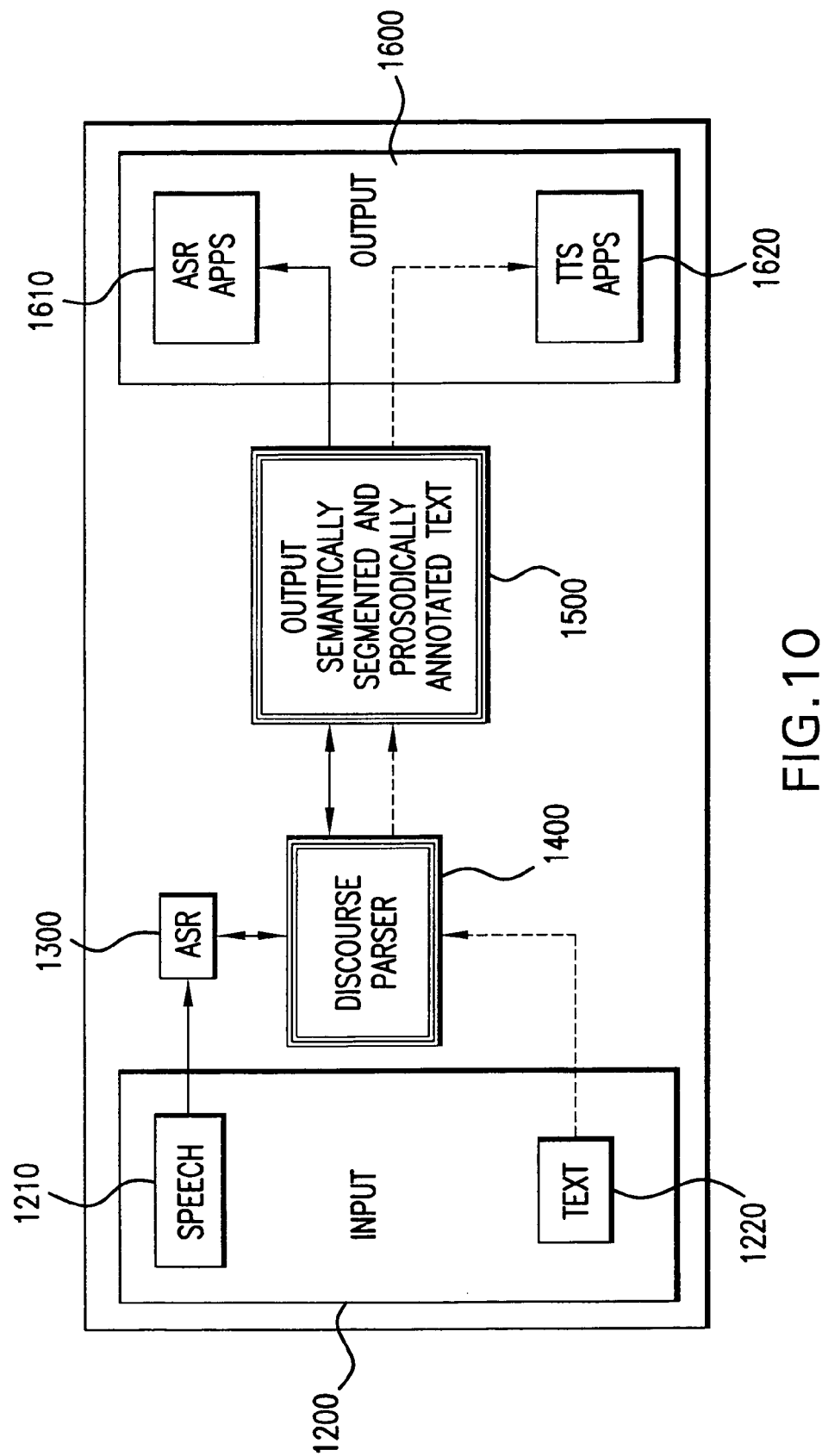
FIG. 10 is a block diagram of an exemplary system for determining predictive models of discourse functions according to this invention.

FIG. 10 is a block diagram of an exemplary system for determining predictive models of discourse functions according to this invention. The system for determining predictive models for discourse functions includes input 1200 from text 1220 and speech 1210 and an automatic speech recognition system 1300 which recognizes the input speech information.

A discourse parser 1400 produces semantically segmented and prosodically annotated text 1500 based on the input text 1220 and the input speech 1210. The semantically segmented and prosodically annotated text 1500 is used to determine predictive models of discourse. The predictive models of discourse are used to generate output information 1600 including updated automatic speech recognition models 1610 and/or text to speech models 1620 that associate the prosodic features at the discourse function level.

FIG. 11 is an exemplary data structure for storing speech utterance prosody information according to this invention. The exemplary data structure for storing prosody information 1070 is comprised of an identifier portion 1010; a discourse function portion 1020; an initial frequency portion 1030, a pitch variation portion 1040; a preceding silence portion 1050 and a boundary tone portion 1060. The exemplary data structure for storing prosody information 1070 stores values for each of the training instances in the training corpus.

The first row of the exemplary data structure for storing speech utterance prosody information 1070 contains a value of "1" in the identifier portion 1010. The identifier portion is used as an index into the information contained in the exemplary data structure for storing speech utterance prosody information.

The exemplary data structure for storing speech utterance prosody information 1070 contains the value "SUBORDINATION" in the discourse function portion 1020. The "SUBORDINATION" value indicates that the training speech utterance has been classified as a subordination type of discourse function under the selected theory of discourse analysis. Typically the classification is verified by multiple automatics and/or human verifiers. It will be apparent that the terms "SUBORDINATION" and "COORDINATION" are merely exemplary and that in various other exemplary embodiments according to this invention, different naming conventions may be used without departing from the scope of this invention.

The exemplary data structure for storing speech utterance prosody information 1070 contains the value "175" in the initial frequency portion 1030. The "175" value indicates the initial frequency information for the training instance speech utterance.

The exemplary data structure for storing speech utterance prosody information 1070 contains the value "0.15" in the pitch variation portion 1040. The "0.15" value indicates the variation in the pitch associated with the subordination discourse function. It will be apparent that the pitch and/or other prosodic variations may be based on variations within a sliding window of one or more discourse functions and/or parts of discourse functions.

The exemplary data structure for storing speech utterance prosody information 1070 contains the value "0.10" in the preceding silence portion 1050. The "0.10" value indicates the duration of any silence preceding the training instance speech utterance.

The exemplary data structure for storing speech utterance prosody information 1070 contains the value "80" in the boundary tone portion 1060. The "80" value indicates the boundary tone associated with the training instance speech utterance.

The second row of the exemplary data structure for storing speech utterance prosody information 1070 contains a value of "2" in the identifier portion 1010. The identifier portion is used as an index into the information contained in the exemplary data structure for storing speech utterance prosody information.

The exemplary data structure for storing speech utterance prosody information 1070 contains the value "SUBORDINATION" in the discourse function portion 1020. The "SUBORDINATION" value indicates that the speech utterance is classified as a subordination type of discourse function based on the selected theory of discourse analysis. As discussed above, the classifications may be optionally verified by a human verifier and/or multiple classification systems.

The exemplary data structure for storing speech utterance prosody information 1070 contains the value "173" in the initial frequency portion 1030. The "173" value indicates the initial frequency information for a training speech utterance. The exemplary data structure for storing speech utterance prosody information 1070 contains the value "0.12" in the pitch variation portion 1040. The value of "0.12" indicates the pitch variation associated with the training instance speech utterance.

The preceding silence portion 1050 contains the value "0.11". The "0.11" value indicates the duration of any silence preceding the training instance speech utterance. The boundary tone portion 1060 contains the value "80". This value indicates the boundary tone associated with the training instance speech utterance.

The third row of the exemplary data structure for storing speech utterance prosody information 1070 contains a "3" in the identifier portion 1010. The identifier portion 1070 is used as an index into the information contained in the exemplary data structure for storing speech utterance prosody information.

The exemplary data structure for storing speech utterance prosody information 1070 contains the value "SUBORDINATION" in the discourse function portion 1020. The "SUBORDINATION" value indicates that the speech utterance is classified as a subordination type of discourse function under the selected theory of discourse analysis.

The exemplary data structure for storing speech utterance prosody information 1070 contains the value "174" in the initial frequency portion 1030 indicating the initial frequency information associated with the training speech utterance.

The pitch variation portion 1040 of the exemplary data structure for storing speech utterance prosody information 1070 contains the value "0.13". This indicates the variation in the pitch for the speech utterance.

The exemplary data structure for storing speech utterance prosody information 1070 contains the value "0.10" in the preceding silence portion 1050. The "0.10" value indicates the duration of any silence preceding the speech utterance.

The boundary tone portion 1060 contains the value "81". This indicates the boundary tone associated with the training instance speech utterance.

The $N^{th}$ row of the exemplary data structure for storing speech utterance prosody information 1070 contains a value of "N" in the identifier portion 1010. The identifier portion is used as an index into the information contained in the exemplary data structure for storing speech utterance prosody information.

The discourse function portion 1020 of the exemplary data structure for storing speech utterance prosody information 1070 contains the value "COORDINATION" indicating that the speech utterance has been classified as a "COORDINATION" type of discourse function under the selected theory of discourse analysis.

The initial frequency portion 1030 contains the value "150". The value "150" indicates the initial frequency information for the training speech utterance. The pitch variation portion 1040 contains the value "0.10" for the training instance speech utterance. This value indicates a pitch variation value that may be useful in determining or identifying discourse functions of type "COORDINATION".

The preceding silence portion 1050 contains the value "0.15". The "0.15" value indicates the duration of the silence preceding the speech utterance. The boundary tone portion 1060 contains the value "95". The "95" value indicates the boundary tone associated with the speech utterance.

FIG. 12 is a data structure for storing exemplary discourse function prosody information according this invention. The data structure for storing exemplary discourse function prosody information 1170 is comprised of an identifier portion 1110; a discourse function portion 1120; an initial frequency portion 1130, a pitch variation portion 1140; a preceding silence portion 1150 and a boundary tone portion 1160. The data structure for storing exemplary prosody information 1170 stores values for each of the determined discourse functions in the training corpus.

The first row of the data structure for storing exemplary discourse function prosody information 1170 contains a value of "1" in the identifier portion 1110. The identifier portion is used as an index into the information contained in the data structure for storing exemplary discourse function prosody information.

The exemplary data structure for storing exemplary discourse function prosody information 1170 contains a value of "SUBORDINATION" in the discourse function portion 1120. In various exemplary embodiments according to this invention, prosody information associated with the discourse function is stored in the initial frequency portion 1130; the pitch variation portion 1140; the preceding silence portion 1150 and the boundary tone portion 1160. In various other exemplary embodiments according to this invention, the prosody information associated with the exemplary discourse function is stored in a prosodic feature vector.

Each row of the data structure for storing exemplary discourse function prosody information 1170 reflects an exemplar of a type of discourse function. That is, the training instances are clustered based on the determined discourse functions. Machine learning methods, statistics or any other method of determining a model based on the prosody information are then used to determine a predictive model for discourse functions. The predictive model for the discourse functions is then saved and/or used to determine the discourse functions contained within new speech utterances.

The data structure for storing exemplary discourse function prosody information 1170 contains the value "175" in the initial frequency portion 1030. This value indicates the average initial frequency information for discourse functions of type "SUBORDINATION".

The data structure for storing exemplary discourse function prosody information 1170 contains the value "0.15" in the pitch variation portion 1040. This value indicates the average variation in the pitch associated with the exemplary discourse functions of type "SUBORDINATION".

The data structure for storing exemplary discourse function prosody information 1170 contains the value "0.10" in the preceding silence portion 1050. The "0.10" value indicates the average duration of the silence preceding the exemplary discourse functions of type "SUBORDINATION".

The data structure for storing exemplary discourse function prosody information 1170 contains the value "80" in the boundary tone portion 1060. This value indicates the average value of the boundary tone frequency associated with a discourse function of type "SUBORDINATION".

The second row of the data structure for storing exemplary discourse function prosody information 1170 contains the value "2" in the identifier portion 1110. The discourse functions portion 1120 contains the value "COORDINATION". This indicates that the prosodic features are associated with a "COORDINATION" discourse function. The initial frequency portion 1130 contains the value "150". This indicates the initial frequency typically associated with "COORDINATION" discourse functions. The pitch variation portion 1140 contains the value "0.10". This indicates pitch variation that is typically associated with discourse functions of type "COORDINATION". The preceding silence portion 1150 contains the value "0.14". This indicates that discourse functions of type "COORDINATION" are typically associated with a preceding silence of "0.14" units. The boundary tone portion 1160 contains the value 100 indicating the typical boundary tone value associated with discourse functions of type "COORDINATION". It will be apparent that the categorization into "SUBORDINATION" and "COORDINATION" discourse functions is merely exemplary and that any known or later developed discourse functions recognizable by the selected theory of discourse analysis may be used in the practice of this invention.

Each of the circuits 10-60 of the system for predicting discourse function models 100 described in FIG. 3 can be implemented as portions of a suitably programmed general-purpose computer. Alternatively, 10-60 of the system for determining predictive models of discourse functions 100 outlined above can be implemented as physically distinct hardware circuits within an ASIC, or using a FPGA, a PDL, a PLA or a PAL, or using discrete logic elements or discrete circuit elements. The particular form each of the circuits 10-60 of the system for determining predictive models of discourse functions 100 outlined above will take is a design choice and will be obvious and predicable to those skilled in the art.

Moreover, the system for determining predictive models of discourse functions 100 and/or each of the various circuits discussed above can each be implemented as software routines, managers or objects executing on a programmed general purpose computer, a special purpose computer, a microprocessor or the like. In this case, system for determining predictive models of discourse functions 100 and/or each of the various circuits discussed above can each be implemented as one or more routines embedded in the communications network, as a resource residing on a server, or the like. The system for determining predictive models of discourse functions 100 and the various circuits discussed above can also be implemented by physically incorporating the system for determining predictive models of discourse functions 100 into software and/or a hardware system, such as the hardware and software systems of a web server or a client device.

As shown in FIG. 3, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, and 3 can each be any known or later developed device or system for connecting a communication device to the system for determining predictive models of discourse functions 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of determining a predictive model for discourse functions comprising the steps of:
   determining a training corpus of speech utterances;
   determining discourse functions associated with speech utterances in the training corpus, the discourse functions being determined automatically based on a theory of discourse analysis;
   determining prosodic features associated with the speech utterances in the training corpus; and
   determining a predictive model of discourse functions by associating the prosodic features determined from the speech utterances in the training corpus with the discourse functions determined from the speech utterances in the training corpus,
   wherein the predictive model of discourse functions is used to predict from prosodic features of a specific recognized speech, a likelihood that speech utterances of the specific recognized speech reflect a specific discourse function, and
   wherein the predictive model of discourse functions is used to predict, based, at least in part, on the prosodic features, a likelihood of a first portion of a speech utterance being associated with a command directed at an application and a second portion of the speech utterance being associated with content being provided to the application.

2. The method of claim 1, in which the theory of discourse analysis is at least one of: the Linguistic Discourse Model, the Unified Linguistic Discourse Model, Rhetorical Structure Theory, Discourse Structure Theory and Structured Discourse Representation Theory.

3. The method of claim 1, in which the predictive models are determined based on at least one of: machine learning, rules.

4. The method of claim 3, in which the machine learning based predictive models are determined based on at least one of: statistics, decision trees, Naïve Bayes.

5. The method of claim 1, in which the prosodic features occur in at least one of a location: preceding, within and following the associated discourse function.

6. The method of claim 1, in which the prosodic features are encoded within a prosodic feature vector.

7. The method of claim 6, in which the prosodic feature vector is a multimodal feature vector.

8. The method of claim 1, in which the discourse function is an intra-sentential discourse function.

9. The method of claim 1, in which the discourse function is an inter-sentential discourse function.

10. A system for determining predictive discourse function models comprising:
    an input/output circuit for retrieving a training corpus of speech utterances; and
    a processor for:
        determining prosodic features associated with speech utterances in the training corpus,
        determining discourse functions associated with the speech utterances in the training corpus, the discourse functions being determined automatically based on a theory of discourse analysis, and
        determining a predictive model for discourse functions by associating the prosodic features determined from the speech utterances in the training corpus with the discourse functions determined from the speech utterances in the training corpus,
    wherein the predictive model of discourse functions is used to predict from prosodic features of a specific recognized speech, a likelihood that speech utterances of the specific recognized speech reflect a specific discourse function, and
    wherein the predictive model of discourse functions is used to predict, based, at least in part, on the prosodic features, a likelihood of a first portion of a speech utterance being associated with a command directed at an application and a second portion of the speech utterance being associated with content being provided to the application.

11. The system of claim 10, in which the theory of discourse analysis is at least one of: the Linguistic Discourse Model, the Unified Linguistic Discourse Model, Rhetorical Structure Theory, Discourse Structure Theory and Structured Discourse Representation Theory.

12. The system of claim 10, in which the predictive models are determined based on at least one of: machine learning, rules.

13. The system of claim 12, in which the machine learning based predictive models are determined based on at least one of: statistics, decision trees, Naïve Bayes.

14. The system of claim 10, in which the prosodic features occur in at least one of a location: preceding, within and following the associated discourse function.

15. The system of claim 10, in which the prosodic features are encoded within a prosodic feature vector.

16. The system of claim 15, in which the prosodic feature vector is a multimodal feature vector.

17. The system of claim 10, in which the discourse function is an intra-sentential discourse function.

18. The system of claim 10, in which the discourse function is an inter-sentential discourse function.

19. Computer readable storage medium comprising: computer readable program code embodied on the computer readable storage medium, the computer readable program code usable to program a computer to determine a predictive model for discourse functions comprising the steps of:
    determining a training corpus of speech utterances;
    determining discourse functions associated with speech utterances in the training corpus of speech utterances, the discourse functions being determined automatically based on a theory of discourse analysis;
    determining prosodic features associated with the speech utterances in the training corpus of speech utterances; and
    determining at least one predictive model of discourse functions by associating the prosodic features with the discourse functions, wherein the predictive model of discourse functions is used to predict from prosodic features of a specific recognized speech, a likelihood that speech utterances of the specific recognized speech reflect a specific discourse function, and wherein the predictive model of discourse functions is used to predict, based, at least in part, on the prosodic features, a likelihood of a first portion of a speech utterance being associated with a command directed at an application and a second portion of the speech utterance being associated with content being provided to the application.

* * * * *